United States Patent [19]

Hopfe

[11] 4,204,406

[45] May 27, 1980

[54] WAVE ENERGY MODULE 2

[76] Inventor: Harold H. Hopfe, 65 Pioneer Dr., Longmeadow, Mass. 01106

[21] Appl. No.: 3,744

[22] Filed: Jan. 15, 1979

Related U.S. Application Data

[63] Continuation-in-part of Ser. No. 935,586, Aug. 21, 1978, abandoned.

[51] Int. Cl.² ............... F03B 13/12; E02B 9/08; F15B 1/02
[52] U.S. Cl. .......................... 60/398; 60/497; 290/53; 405/76; 417/331
[58] Field of Search ........... 60/398, 416, 495, 497, 60/504, 505; 290/42, 53; 405/76; 417/100, 330, 331, 337

[56] References Cited

U.S. PATENT DOCUMENTS

| 671,592 | 4/1901 | Hamilton et al. | 417/331 |
|---|---|---|---|
| 748,757 | 1/1904 | Langstroth | 417/331 |
| 851,549 | 4/1907 | Neal | 417/332 X |
| 2,966,776 | 1/1961 | Taga | 60/412 X |
| 4,105,368 | 8/1978 | Waters | 417/332 X |

Primary Examiner—Edgar W. Geoghegan

[57] ABSTRACT

A device for efficiently extracting hydrodynamic energy from ocean waves, comprising a floating platform structure, an anchoring means which is connected to piston shafts of an array of hydraulic cylinders having pistons therein within the platform structure which act through a network of check valves as piston pumps for transferring hydraulic fluid from an air cushioned low pressure reservoir to an air cushioned high pressure reservoir, a hydraulic motor or turbine mechanically coupled to an electric generator and hydraulically connected between the two reservoir tanks which produces electricity as fluid is allowed to flow through the motor or turbine from the high pressure reservoir to the low pressure reservoir.

18 Claims, 7 Drawing Figures

WAVE ENERGY MODULE 2

This application is a continuation-in-part of U.S. Pat. Ser. No. 935,586, filed Aug. 21, 1978, now abandoned.

My invention relates to a method of extracting energy from ocean waves and converting the extracted energy to a more useful form.

An important object of the invention is that it provide an efficient means of extracting hydrodynamic energy from ocean waves in the form of simple mechanical motion.

A further object of the invention is the immediate application of such mechanical motion to the production of electric or hydraulic energy.

Another object of the invention is that it be highly portable and completely self-contained, requiring no exterior structure for its support or successful operation.

Other objects and advantages of the invention will be apparent during the course of the following description.

In the accompanying drawings, forming a part of this specification, and in which like numerals are employed to designate like parts throughout the same, FIG. 1 is a plan view of the WEM (Wave Energy Module) 2.

Figure 1:
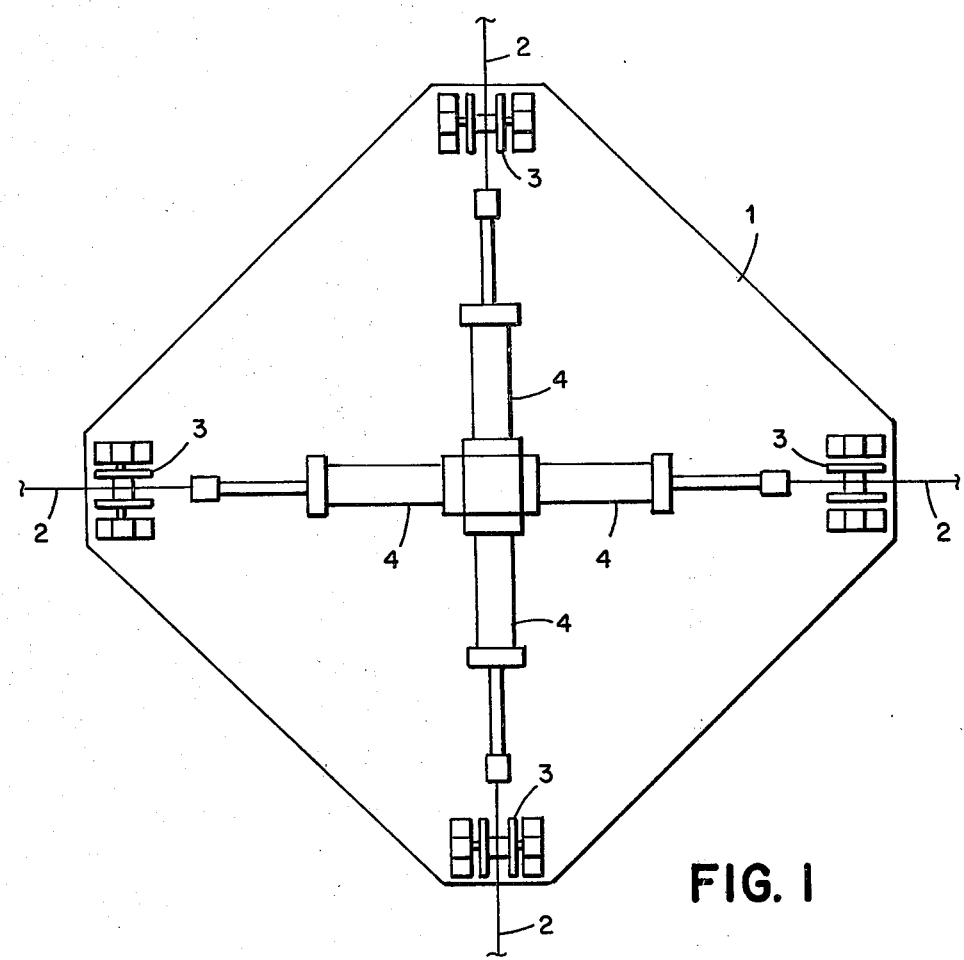

In the drawings, wherein for the purpose of illustration, is shown a preferred embodiment of my invention, the numeral 1 designates a floating platform of buoyant construction having a rigid top surface suitable for supporting elements of the apparatus to be mounted upon it. The numeral 2 designates any number of mooring lines which pass over guide pulleys 3 and connect to the shaft ends of hydraulic cylinders 4 which are securely fastened to the platform 1.

When employed in continental waters in a reasonably vigorous wave climate, typical overall dimensions of the platform 1 might be 100 feet × 100 feet × 5 feet high. The edges of the platform 1 should be rounded to reduce wave reflection. Numerous variations to the specific shape illustrated in FIG. 1 are possible. However, shapes such as regular polygons having more than three sides and truncated vertices, or a circular shape are preferred when the direction of wave propagation is variable, so as to reduce tendencies toward rotation of the platform 1 about its vertical axis of symmetry, due to inadvertent asymmetrical wave action. The closer the approximation to a circular shape, the lesser will be the rotational tendency.

Structurally the platform 1 can be a hollow, relatively thin, steel plate construction with internal stiffening members and reinforcing structures as necessary to provide sufficient support for the various elements to be mounted on the platform and to provide adequate flexural strength for the platform 1 itself. To protect the platform 1 from corrosion, the exposed outer surfaces are preferably covered with a non-corroding coating, such as certain polymeric materials that are used in the chemical process industry. It is also desirable to fill the interior of the platform 1 with a buoyant flotation material to prevent flooding in the case of accidental rupture of the outer surface. Any of several available closed cell polymeric foams are quite suitable for this purpose. By generating the foam within the platform 1 so as to tightly fill all of the available space, the flexural stiffness of the overall platform 1 structure can be significantly enhanced.

An alternative to mounting the various system elements on the top surface of the platform 1 is to enclose them within the platform and provide the platform 1 with suitable ports and closures to allow proper operation, and to facilitate maintenance.

Common materials for mooring lines 2 are steel chain and cable. These materials are suitable, as well as any other materials having comparable flexibility, tensile strength, and extensional modulus. Cabling comprised of polymer bonded oriented alloy steel filaments are particularly attractive in this regard and possess the added features of superior wear and corrosion resistance.

Figure 2:
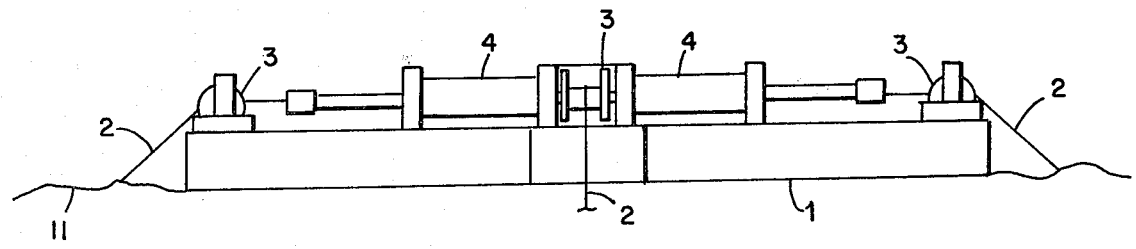
FIG. 2 is an elevation view of the WEM 2.
Figure 3:
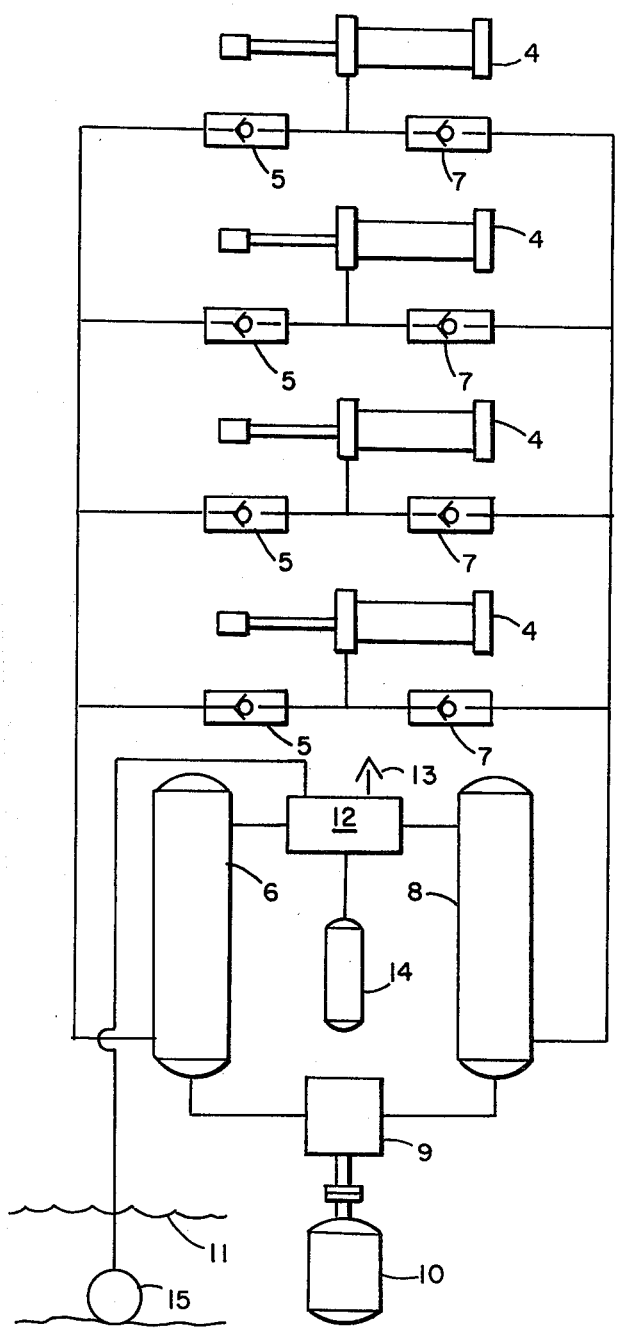
FIG. 3 is a schematic diagram of the energy conversion system.

While FIGS. 1 and 2 show the hydraulic cylinders 4 in a horizontal attitude, a vertical attitude is also perfectly acceptable, and eliminates the need for guide pulleys 3. However, a gimballed support system is preferred in that case in order to avoid possible large bending moments on the cylinder shafts during operation of the WEM 2. Flexible fluid line connections to the hydraulic cylinders are then also necessary. In the case of vertically mounted hydraulic cylinders 4, extra-long cylinder shafts can be used in place of the mooring lines 2. While FIGS. 1, 2 & 3 illustrate a WEM 2 having four hydraulic cylinders 4, any number of cylinders could be used. The hydraulic cylinders are employed here as piston pumps. It is also possible to substitute a rotary pump and windlass arrangement for each hydraulic cylinder.

The numeral 5 designates hydraulic check valves which permit hydraulic fluid from an air cushioned low pressure reservoir 6 to flow into the hydraulic cylinders 4.

The numeral 7 designates hydraulic check valves which permit hydraulic fluid to flow out of the hydraulic cylinders 4 and into an air cushioned high pressure reservoir 8.

The numeral 9 designates a hydraulic motor or turbine which is hydraulically connected between the two fluid reservoirs 6 and 8 and mechanically coupled to an electric generator 10.

In order to keep down the size and number of hydraulic cylinders needed, a relatively high fluid pressure is desirable. For example, a WEM 2 having a high pressure fluid reservoir 8 operating around 1,000 pounds per square inch, equipped with a 1 megawatt electric generator 10 and 6 hydraulic cylinders 4, would require a cylinder bore on the order of 1½ feet. WEM 2 units of greater than 1 megawatt capacity are not expected to be functionally or economically attractive, and operating fluid pressures greater than 1,500 PSI are not anticipated.

While FIG. 3 shows one high pressure reservoir 8 and one low pressure reservoir 6, which are shared with four hydraulic cylinders 4, any number of such reservoirs can be employed, connected either in series or in parallel.

The numeral 11 designates the surface of the water.

The numeral 12 designates an intelligent pressure controller which regulates the air cushion pressure in the reservoirs 6 & 8, depending upon information received from a sea condition monitor 15. The controller 12 obtains air from a high pressure source 14 and releases excess air through a vent 13.

A suitable alternative method for maintaining optimum pressures in the high pressure reservoir 8 and low pressure reservoir 6 is to adjust the quantity of hydraulic fluid in each instead of the quantity of air. This alternative is particularly attractive in the case where the hydraulic fluid is sea water and significant leakage flows exist, since a source of high pressure makeup fluid is easily provided by means of a small auxiliary pump which takes water directly from the sea. However, filtering of the sea water is necessary to avoid fouling of the working elements of the WEM 2.

The sea condition monitor 15 can be any variety of continuous transmitting water level gauge such as bottom pressure sensing transducers, surface penetrating capacitance probes, wave riders, etc. While each WEM 2 can have its own dedicated sea condition monitor 15, it is probably not necessary and one such monitor can be shared between several WEM 2 units which are all located in the same general sea location.

The intelligent pressure controller 12 receives a continuous signal from the sea condition monitor 15 which is proportional to the instantaneous water level in the vicinity of the monitor. This signal can be processed to determine such information as mean water depth, mean wave height, mean wave period, mean wave length as well as well as wave height, period and length statistical spectra. A control algorithm can then use such wave condition information to calculate the optimum hydraulic fluid pressures needed in the two reservoirs 6, 8 for maximum power conversion efficiency. The calculated optimum pressure then becomes the set point for a conventional closed loop pressure control system. To handle such control algorithm, a small minicomputer or microprocessor is preferred.

While the control system could be used to make rapid adjustments to the operating fluid pressures, it is considered more practical to only employ the system as a means of adjusting for the relatively slow changes that may occur in the sea conditions over time periods on the order of 1-2 hours.

There are a number of suitable means for transmitting the signal from the sea condition monitor 15 to the intelligent controller 12. The preferred methods are direct electrical cabling and AM or FM radio wave transmission.

The elements 6-10 and 12-15 can be located on board and dedicated to a single WEM 2 or can be remotely located to service any number of WEM 2's.

In order to achieve extremely long maintenance-free hydraulic cylinder life, the particular internal arrangement specified below is preferred.

The numeral 16 designates the hydraulic cylinder shafts which are mechanically coupled to pistons 17 by means of flexible links 18. The use of a flexible link 18 is permissible in this case, since the intended operation of the hydraulic cylinder is such that the link will always be in tension. Suitable examples of a flexible link are mechanical universal joints, wire rope or metal chain. The use of links comprised of rubbery materials is less desirable since they tend to introduce a greater degree of unnecessary axial elasticity. In the case where a wire rope cable is employed as the flexible link, it can be provided with a smooth polymeric coating and extended to take the place of the shaft 16.

The numeral 19 designates a pressurized working fluid within the shaft end of the hydraulic cylinders. The preferred fluid in this case is well-filtered sea water, since uncollected leakage flows would be non-polluting to the ocean environment. However, any other incompressible fluid could be used if adequate means for collecting leakage flows is provided.

The numeral 20 designates a small annular space between the pistons 17 and the internal surfaces of the hydraulic cylinders 4.

Figure 5:
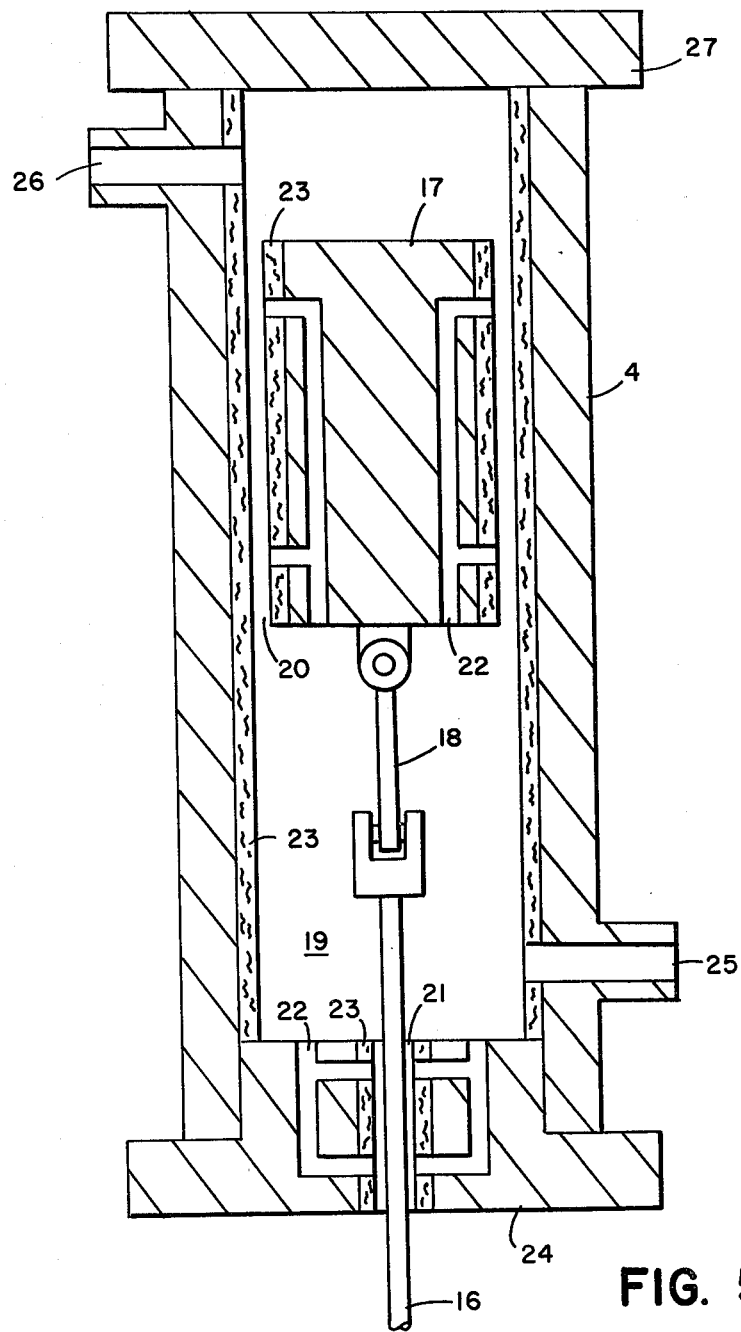
FIG. 5 is a section view illustrating the preferred internal construction for the hydraulic cylinders employed by the WEM 2.

The numeral 21 designates a small annular space between the shafts 16 and cylinder bodies 4. The numeral 22 designates a system of fluid distribution channels which allow a small leakage flow of pressurized fluid 19, which is radially directed into the annular clearances 20, 21. By employing a series of three or more such channels, which are symmetrically arranged about the longitudinal axis of the cylinders, and allowing radial discharge of fluid from at least two well-separated points along each channel, as shown in FIG. 5, a hydrostatic bearing is formed within the annular spaces 20, 21, which acts as a means for maintaining mutual concentricity and axial alignment of the elements (16, 4 & 17, 4) forming the annuli 20, 21 without direct physical contact of said elements.

The numeral 23 designates a thin protective coating of polymeric material, applied to the surfaces of the piston 17, the inner wall of the cylinder 4, and the shaft guide 24. The main purpose of the coating is to protect these surfaces from corrosion by the working fluid 19. The coating can be applied to the piston shaft 16 as well or any other surfaces that need such protection. Since the various components to which the coating is applied may undergo a significant amount of flexing during normal operation of the WEM 2, a structurally compliant coating material is desirable. Various polymeric substances are excellent materials for such an application. Teflon, in particular, is probably the best, due to its extremely inert characteristics and exceptional anti-fouling properties.

Since thin coatings of polymeric substances can be mechanically fragile and lacking in dimensional stability, it may be desirable to physically combine the polymeric material with a quantity of relatively corrosion-resistant metal. There are commercial processes for producing such polymeric/metal composite coatings. An example is the Teflon/nickel alloy composite called NEDOX ® which is available from General Magnaplate Corporation of Linden, N.J. Such a coating is an excellent alternative to a pure polymeric substance. However, the specific polymer and metal to be preferred depends upon the choice of working fluid 19. When sea water is to be the working fluid, the particular combination of Teflon and tin is quite attractive. Corrosion rates for tin in sea water are on the order of only 0.000,050 inches per year. Another attractive combination is Teflon and a special nickel/chromium alloy containing small quantities of molybdenum and niobium, which is finding some significant success in underwater bearing applications in the off-shore oil industry. In fact, the alloy itself can be considered as a possible liner material.

The numeral 25 designates a port in the hydraulic cylinder 4 near the shaft end, which allows flow of the working fluid 19 into and out of the hydraulic cylinder 4 as the piston 17 travels back and forth along the longitudinal axis.

The numeral 26 designates a port in the hydraulic cylinder 4 near the end opposite the shaft, which allows the discharge of leakage fluid from the annular space 20. If desirable, a means of collecting the leakage flow from the annular space 22 and the port 26 can be provided, and all of the collected leakage flows combined and returned to the low pressure fluid reservoir 6, by means of a small auxiliary pump.

The numeral 27 designates an end closure for the hydraulic cylinder 4.

The WEM 2 requires a mooring system to not only maintain a desired physical location at sea, but also to allow proper functioning of the device. A number of anchoring means can be considered, such as conventional ship anchors, massive deadweight anchors, piles driven into the sea bed, augers screwed into the sea bed, etc. Most of these methods work best when the mooring forces have a relatively small vertical component. However, the WEM 2 requires large vertical mooring forces for its proper functioning. Therefore, a modified reaction plate concept is preferred.

The numeral 28 designates a flat horizontal reaction plate, resting on the sea bed 29, and having a top surface geometry which is similar to, but slightly larger than, the bottom surface geometry of the floating platform 1. With such an arrangement, the same hydrodynamic action that produces lifting forces on the bottom surface of the floating platform 1 also produce downward acting reaction forces of a comparable magnitude which result in a natural means of holding the reaction plate 28 in place. The reaction plate 28 is made slightly larger than the floating platform 1 to allow for some degree of horizontal offset of the two elements, as well as for other edge effects on performance. The reaction plate 28 is preferably constructed from nonbuoyant materials such as steel or steel-reinforced concrete, so as to realize a degree of supplimentary securing force, due to the effective weight of the plate itself. In fact, the weight of the plate can be chosen so as to entirely compensate for any inefficiencies in the reaction plate method.

The numeral 30 designates a plurality of cleats, which are securely attached to the bottom surface of the reaction plate 28 and pressed into the sea bed 29 by the weight of the reaction plate 28. The purpose of the cleats 30 is to discourage sliding of the reaction plate 28 over the sea bed 29 due to unbalanced horizontal force components which may be acting on the reaction plate 28 during operation of the WEM 2. A variety of cleat 30 shapes are possible. The cleats are preferably constructed from non-corroding metal, such as stainless steel or monel, but can also be constructed from carbon steel or other materials, and provided with a corrosion-resistant coating.

Figure 6:
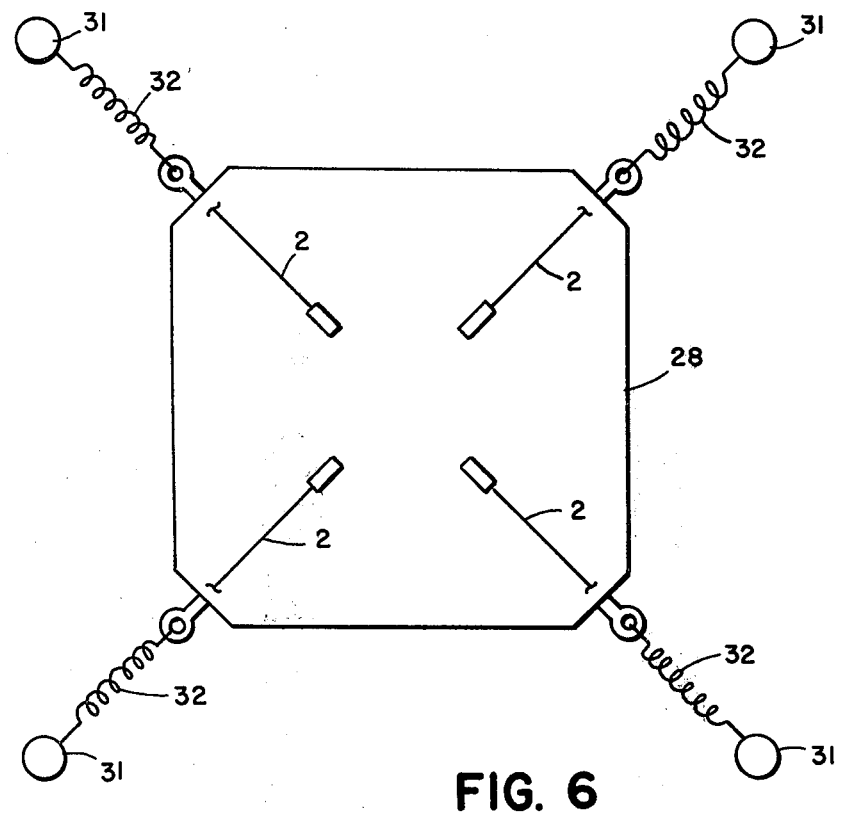
FIG. 6 is a plan view of a mooring system for the WEM 2.
Figure 7:
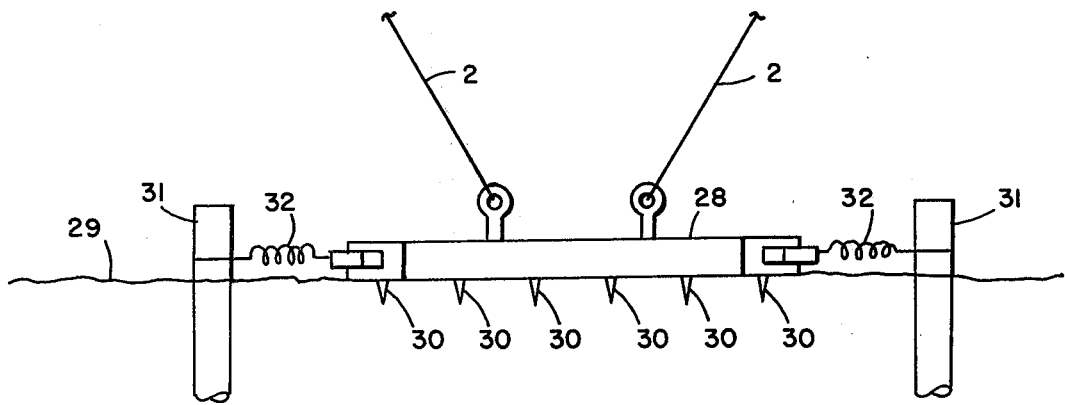
FIG. 7 is an elevation view of a mooring system for the WEM 2.

The action of waves passing over the reaction plate 28, produces a downward acting force field which travels over the top surface of the reaction plate 28. At the same time, a corresponding force field of comparable magnitude and phase passes under the bottom surface of the floating platform 1. However, the reaction forces in the mooring lines 2 are acting only at fixed locations on the reaction plate 28 surface. Consequently moments are produced as a wave passes, which tend to first rotate the reaction plate 28 about one edge and then about an opposite edge. The magnitude of this effect can be reduced by arranging the mooring lines 2 so that, under quiescent conditions, they are mutually upwards divergent in a symmetrical pattern as illustrated in FIGS. 6 and 7.

Another means of reducing the tendency toward rotation of the reaction plate 28 about its edges is to distribute the excess weight of the reaction plate 28 such that it is concentrated at the edges of the plate. The concentrated weight can be in the form of vertical peripheral wall which then provides a means of additional positional stability, because of the inertia of the water contained within the walls. Also, the contained water is easily replaceable with sand or other high density debris as an inexpensive means of increasing the reaction plate 28 weight.

The numeral 31 designates a plurality of piles, or similar devices having good horizontal stability, which are located about the perimeter of the reaction plate 28 in a symmetrical pattern.

The numeral 32 designates a plurality of elastic connectors which physically join the piles 31 to the reaction plate 28. The purpose of the elastic connectors 32 is to provide a repositioning effect in the event that the reaction plate 28 is significantly displaced, as may occur under violent sea conditions. The elastic connectors 32 can be simple coil springs as illustrated in FIGS. 6 and 7, or any of several alternative means, such as elastomeric rope, pneumatic springs, etc. While a reaction plate 28 resting on the sea bed 29 is preferred, it can also be employed at any intermediate elevation between the sea bed 29 and the floating platform 1.

The operation of the WEM 2 is as follows:

Having located the entire apparatus in a desirable spot in the sea, and made appropriate power transmission connections from the electric generator 10 to an on shore or other energy using, distributing, storage or handling system to be served by the WEM 2, the device will proceed to extract and convert hydrodynamic energy from ocean waves in the following manner.

As a wave crest approaches the WEM 2, the water surface 11 increases its elevation relative to the floating platform 1 causing an increase in its upward buoyant force. The increased buoyant force is matched by equivalent increases in tension in the anchor lines 2. The increase in anchor line tension in turn causes extension of the shafts of the hydraulic cylinders 4 and forces hydraulic fluid through the check valves 7 into the high pressure reservoir 8.

As the wave crest passes, and the floating platform begins to settle into the trough of the wave, the slack generated in the anchor lines is accommodated by the flow of low pressure hydraulic fluid from the reservoir 6, through check valves 5, and into the hydraulic cylinders 4, causing shaft retraction and tightening of the anchor lines.

Thus, energy is extracted and converted during each wave half cycle as the floating platform rides from trough to crest. The other half cycle is used for resetting the apparatus for the next half cycle.

The hydraulic fluid power represented by the pressure differential and quantity of fluid in the two reservoirs 6, 8 is converted to electrical power by allowing fluid to flow through the hydraulic motor 9, which in turn drives the electric generator 10.

The sea condition monitor 15 transmits information such as wave height, wave length, wave period and water depth to the intelligent controller 12, which regulates the air pad pressure in the fluid reservoirs 6, 8 so as to achieve optimum power conversion efficiency regardless of varying sea conditions.

Energy conversion efficiency is also enhanced by employing a platform whose length and width are dimensionally similar to the length of the ocean waves, and whose mass is sufficiently low to produce a natural frequency for vertically directed mechanical oscillation due to the buoyancy of the water which is high compared to the ocean wave propagation frequency.

Figure 4:
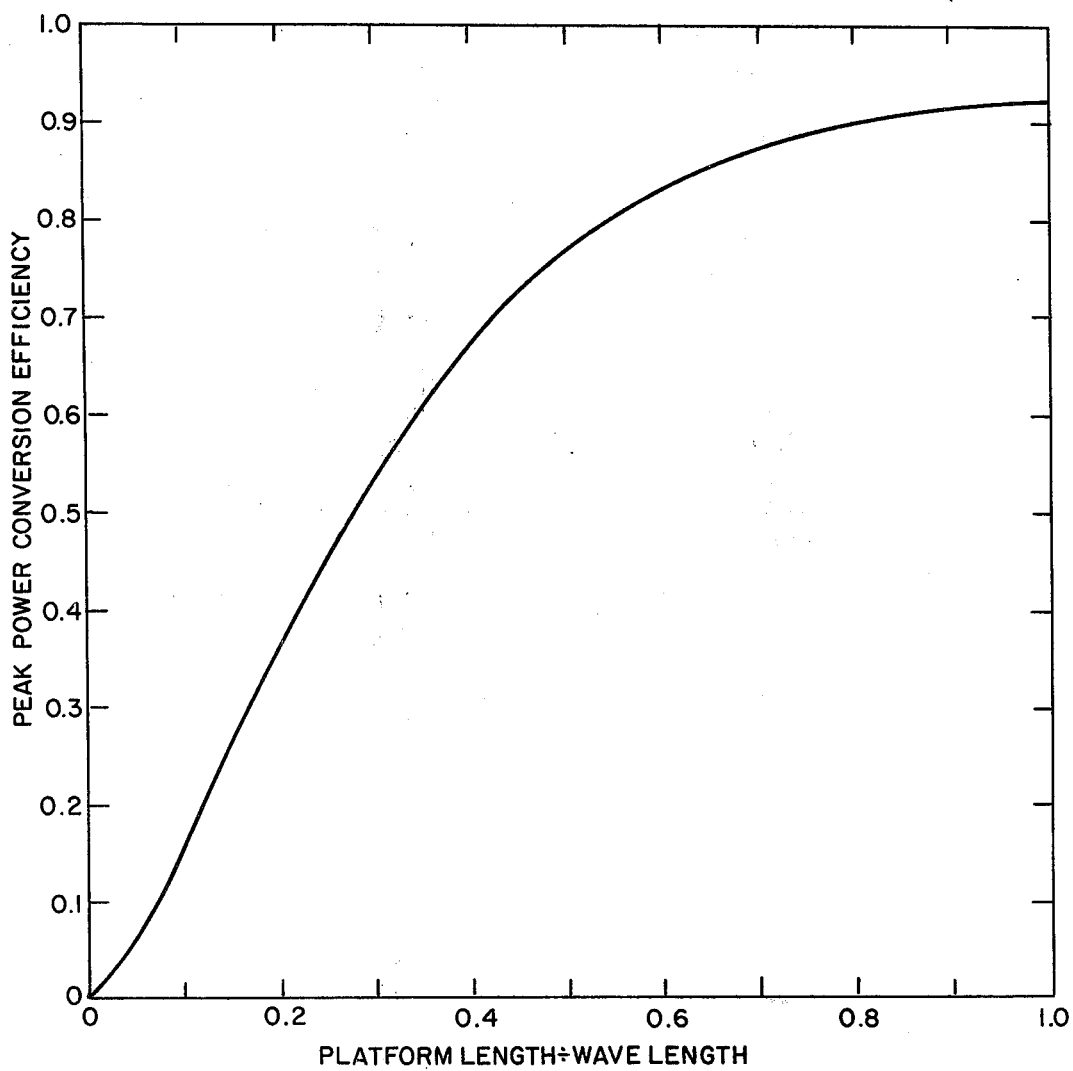
FIG. 4 is a plot of wave energy conversion efficiency vs relative platform length, which has been experimentally obtained by the inventor.

While the foregoing efficiency conditions are not necessarily apparent from existing literature, they are well supported by tests that have been conducted by the inventor. FIG. 4 is an example of such test results where various platforms of high natural frequency were employed to show the effect of platform length on power conversion efficiency.

Other tests have also been conducted which show that the optimum hydraulic fluid pressure in the high pressure reservoir 8 for maximum energy conversion efficiency depends upon wave height, wave length, and water depth.

Accommodation of changes in water level is inherent in the WEM 2 when sufficiently long hydraulic cylinders are employed.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A device for efficiently extracting hydrodynamic energy from ocean waves, comprising a floating platform structure, an anchoring means which is connected to piston shafts of an array of hydraulic cylinders having pistons therein within the platform structure which act through a network of check valves as piston pumps for transferring hydraulic fluid from an air cushioned low pressure reservoir to an air cushioned high pressure reservoir, a sea condition monitor and intelligent controller which regulates the air cushion pressure in the reservoir tanks so that optimum energy conversion efficiency is achieved for any given sea condition, and a hydraulic motor or turbine mechanically coupled to an electric generator and hydraulically connected between the two reservoir tanks which produces electricity as fluid is allowed to flow through the motor or turbine from the high pressure reservoir to the low pressure reservoir.

2. A device according to claim 1 wherein the platform structure has a length and width of 100 feet or greater so as to achieve improved energy conversion efficiency under typical open sea conditions.

3. A device according to claim 1 wherein the platform structure is of sufficiently low mass to result in a vertical mode natural frequency due to the buoyancy of the water which is greater than 0.5 Hertz so as to achieve improved energy conversion efficiency under typical open sea conditions.

4. A device according to claim 1 wherein excess anchor line generated at low tide and during the passing of wave troughs is stored by the shaft retraction of the pistons in the hydraulic cylinders due to the flow of hydraulic fluid into the hydraulic cylinders from the low pressure reservoir.

5. A device according to claim 1 wherein a high degree of portability is realized due to the integral construction of the floating platform with all other elements of the device, except anchor line, said integrally constructed unit requiring no external structure for its support or proper functioning.

6. A device according to claim 1 wherein hydrostatic bearings are employed between the interior walls of the hydraulic cylinders and their pistons and piston shafts as a means of minimizing friction and mechanical wear of said elements.

7. A device according to claim 6 wherein pistons and piston shafts are allowed to be self-aligning with respect to the hydraulic cylinders, owing to the use of a completely flexible link between pistons and piston shafts.

8. A device according to claim 1 wherein non-corroding polymeric coatings, such as Teflon, are employed as a means of minimizing corrosive wear and fouling of the hydraulic cylinders and their pistons and shafts.

9. A device according to claim 8 wherein the polymeric coating is infused within a well-adhered, porous matrix of corrosion-resistant metal, such as tin, so as to improve its mechanical stability and wear resistance.

10. A device according to claim 1 wherein the anchoring means is a reaction plate resting on the sea bed, and having cleats on its bottom surface to inhibit horizontal motion.

11. A device according to claim 10 wherein the mooring lines between the reaction plate and floating platform are symmetrically connected to each, but with a smaller mutual separation at the reaction plate, as a means of discouraging rotation of the plate about its edges during the passing of wave crests.

12. A device according to claim 10 wherein horizontal elastic connections between the reaction plate and a symmetrical array of piles are employed as a means of reestablishing the location of the reaction plate after an upsetting condition has occurred.

13. A device according to claim 10 wherein the positional stability of the reaction plate is improved by means of a continuous concentrated weight positioned along the perimeter of said reaction plate.

14. A device according to claim 10 wherein a continuous vertical wall is provided along the perimeter of the reaction plate and the space within is filled with high density aggregate materials as a means of increasing the effective weight of the reaction plate.

15. A device according to claim 1 wherein the shape of the platform in the plane of contact with the water surface is made circular or nearly circular as a means of discouraging rotation of the platform about its vertical axis of symmetry due to the action of waves, currents, and winds of varying directionality.

16. A device according to claim 1 wherein the interior volume of the platform is filled with a closed cell polymeric foam or similar non-porous, buoyant, monolithic filler as a means of rendering the platform leak-proof and improving the platform's flexural rigidity.

17. A device according to claim 1 wherein the intelligent controller is a minicomputer or microprocessor.

18. A device according to claim 10 wherein the reaction plate resides at any elevation between the sea bed and the floating platform and is moored to the sea bed by conventional means.

* * * * *